US011669239B1

(12) United States Patent
Smith (10) Patent No.: US 11,669,239 B1
(45) Date of Patent: Jun. 6, 2023

(54) SMART GLOBE

(71) Applicant: Khai Smith, Las Cruces, NM (US)

(72) Inventor: Khai Smith, Las Cruces, NM (US)

( * ) Notice: Subject to any disclaimer, the term of this patent is extended or adjusted under 35 U.S.C. 154(b) by 0 days.

(21) Appl. No.: 17/457,461

(22) Filed: Dec. 3, 2021

(51) Int. Cl.
*G06F 3/0488* (2022.01)
*G06F 3/14* (2006.01)
*G06F 3/04845* (2022.01)

(52) U.S. Cl.
CPC ........ *G06F 3/0488* (2013.01); *G06F 3/04845* (2013.01); *G06F 3/1446* (2013.01); *G06F 2203/04806* (2013.01)

(58) Field of Classification Search
None
See application file for complete search history.

(56) References Cited

U.S. PATENT DOCUMENTS

| 2010/0182145 | A1* | 7/2010 | Ungari | G09B 29/10 345/173 |
| 2015/0286185 | A1* | 10/2015 | Kim | G03H 1/2249 359/9 |
| 2017/0084205 | A1* | 3/2017 | Sigelagelani | G09B 27/08 |
| 2018/0373329 | A1* | 12/2018 | Fisunenko | G09F 9/301 |
| 2019/0337104 | A1* | 11/2019 | Benninghoff | A47F 1/00 |
| 2020/0043408 | A1* | 2/2020 | Foody | G09G 3/3225 |

* cited by examiner

*Primary Examiner* — Aneeta Yodichkas
(74) *Attorney, Agent, or Firm* — Tatonetti IP (57) ABSTRACT

Implemented is a smart touch screen globe that sits on top of a stand. The stand has its own secondary display device that enables a user to control some of the features of the touch screen globe. The upper part of the stand has a vent to enable airflow throughout the device and globe and reduce heat within the device. The stand's base is slightly larger than the globe itself to accommodate the globe's weight and size better and thereby maintain the device's sturdiness. The stand is configured with various components and electronics, including Bluetooth, Wi-Fi, USB (Universal Serial Bus) ports, microphone, speaker, power ports, internal compass, battery, among other components.

13 Claims, 13 Drawing Sheets

SMART GLOBE

BACKGROUND

Classrooms and various learning and professional environments often have globes that are used to represent the Earth, such as where countries and continents are located relative to one another. While touchscreen displays and two-dimensional physical maps can be used in addition to or from the globe, each available option has utility and drawbacks for given use scenarios.

SUMMARY

Implemented is a smart touch screen globe that sits on top of a stand. The stand has its own secondary display device that enables a user to control some of the features of the touch screen globe. The upper part of the stand has a vent to enable airflow throughout the device and globe and reduce heat within the device. The stand's base is slightly larger than the globe itself to accommodate the globe's weight and size better and thereby maintain the device's sturdiness. The stand is configured with various components and electronics, including Bluetooth, Wi-Fi, USB (Universal Serial Bus) ports, microphone, speaker, power ports, internal compass, battery, among other components.

The globe's primary touchscreen surface may utilize various available touchscreen technologies, including a surface capacitive touch screen, projected capacitive touch screen, surface acoustic wave touch screen, or infrared touch screen, among others. The globe's glass may come in two pieces that connect at 90 degrees and 270 degrees to minimize the interruption of the glass on the user's experience. The globe may have a handle attached at the top of the globe and extends to the stand. This can provide easier handling and transporting of the globe for the user and reduce accidents and damage given the globe is comprised of predominantly glass. Inlets and outlets are positioned at opposite sides of the smart globe's base and allow air to travel through the smart globe's display for cooling purposes.

The globe has an internal support structure that supports the touchscreen glass. The support structure has a linear rod that extends from the stand-up to a central area of the globe's interior. Several support rods extend radially around the globe's interior and engage with the touchscreen glass to provide greater support to the globe. The point of engagement between the support rods and the globe may include some rubber, sponge, or cloth component (or any combination thereof) to provide a relatively softer cushion for the engagement.

The globe can have network connectivity to interact with other computing devices and remote services. The globe can operate local or remote applications and be used for various purposes, including education, games, productivity, etc. For example, the globe can be used to show better lunar research, airplane flight patterns, weather patterns, shipping, and railroad lines, climate change research, civilization timelines, satellite monitoring, ocean waste and dump piling, and species migrational patterns (e.g., birds, whales, fishes, sharks, mammals, etc.). Viewing these elements on an actual globe can provide greater user experiences and potentially more accurate viewing than a flat-screen display. Furthermore, users can do research and programming on their personal computer or laptop to create a model for the smart globe.

DETAILED DESCRIPTION

Figure 1:
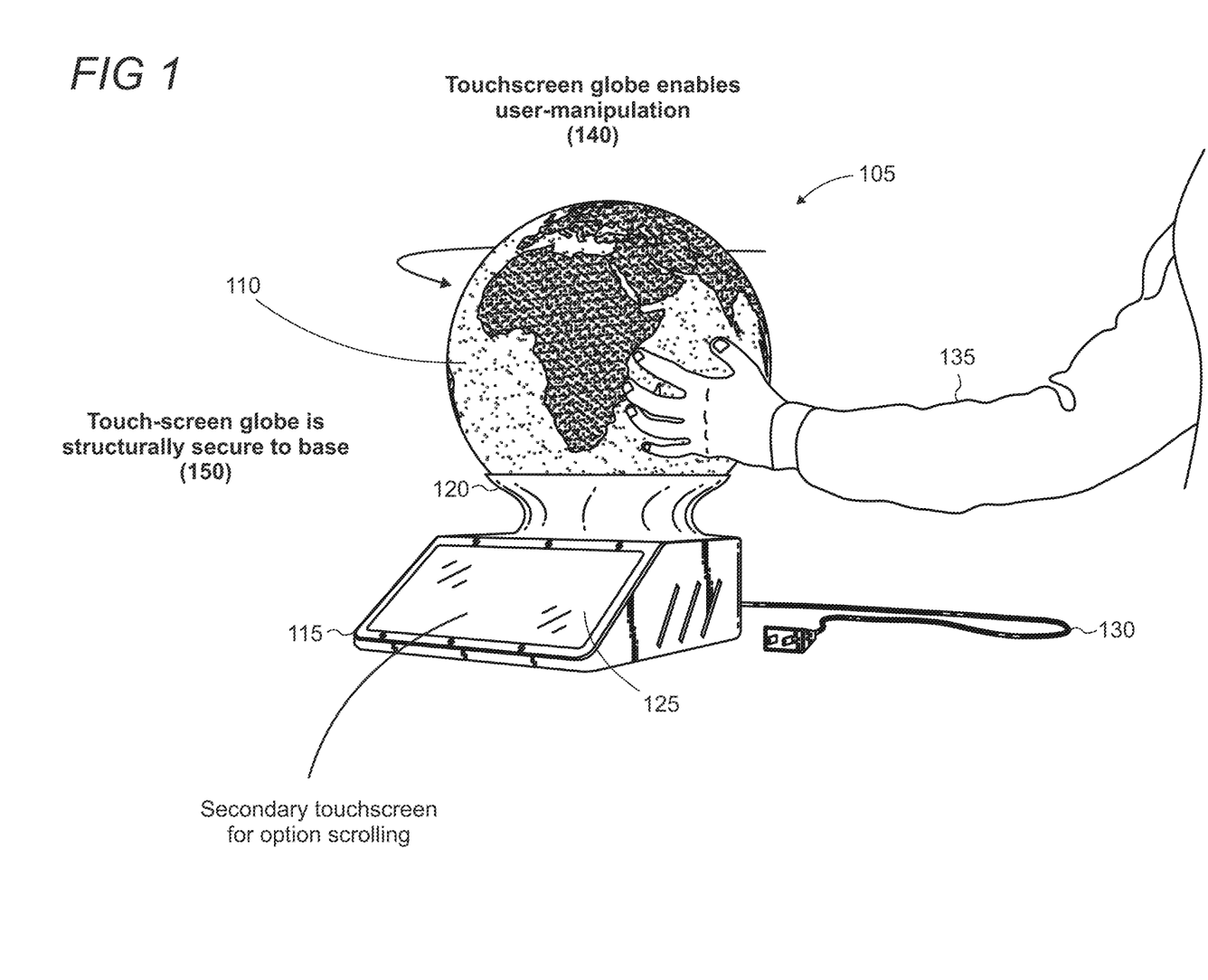
FIGS. 1 and 2 show illustrative representations of a smart globe from a front and rear perspective view.
Figure 2:
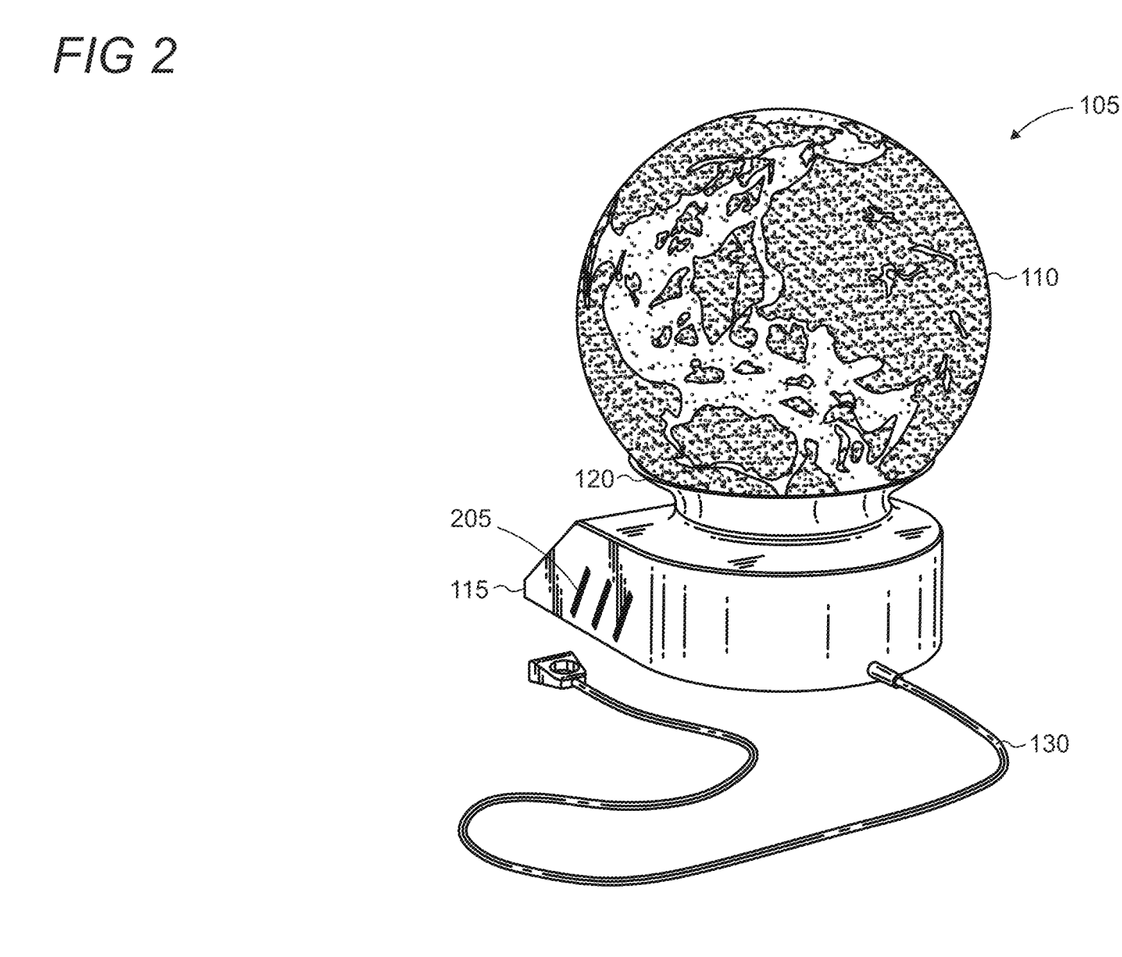

FIGS. 1 and 2 show illustrative representations in which a smart globe 105 includes a primary touchscreen 110 that is spherically shaped to represent a globe and a secondary touchscreen 125 that is, in this implementation, flat. The secondary and primary touchscreens may operate in tandem in that actions and input performed on the primary touchscreen can influence the secondary touchscreen's display and vice versa. The primary touchscreen's ability to receive touch-input enables user-manipulation by user 135, as representatively illustrated by numeral 140. In typical implementations, the secondary touchscreen may be configured to expose various options and applications to the user for operation by the primary touchscreen responsive to receiving user input. The secondary touchscreen is angled for an easier display to the user while also being part of the same structure as the primary touchscreen.

The smart globe 105 includes a base 115 on which a receiving structure 120 is implemented for structurally securing the primary touchscreen 110 to the base, as representatively illustrated by numeral 150. The receiving structure and base may be comprised of plastic, metal, or a combination thereof. The base includes an outlet 205 for outputting air, as discussed in greater detail below. The primary touchscreen may be secured to the receiving structure using various connecting mechanisms, such as adhesives, flanges, bolts, and screws that do not interfere with the primary touchscreen's integrity, etc., and any combination thereof. The smart globe further includes a power source 130, which may be utilized to provide power to the smart globe's electronic components and circuitry. A rechargeable battery that is capable of holding a charge may also be utilized.

Figure 3:
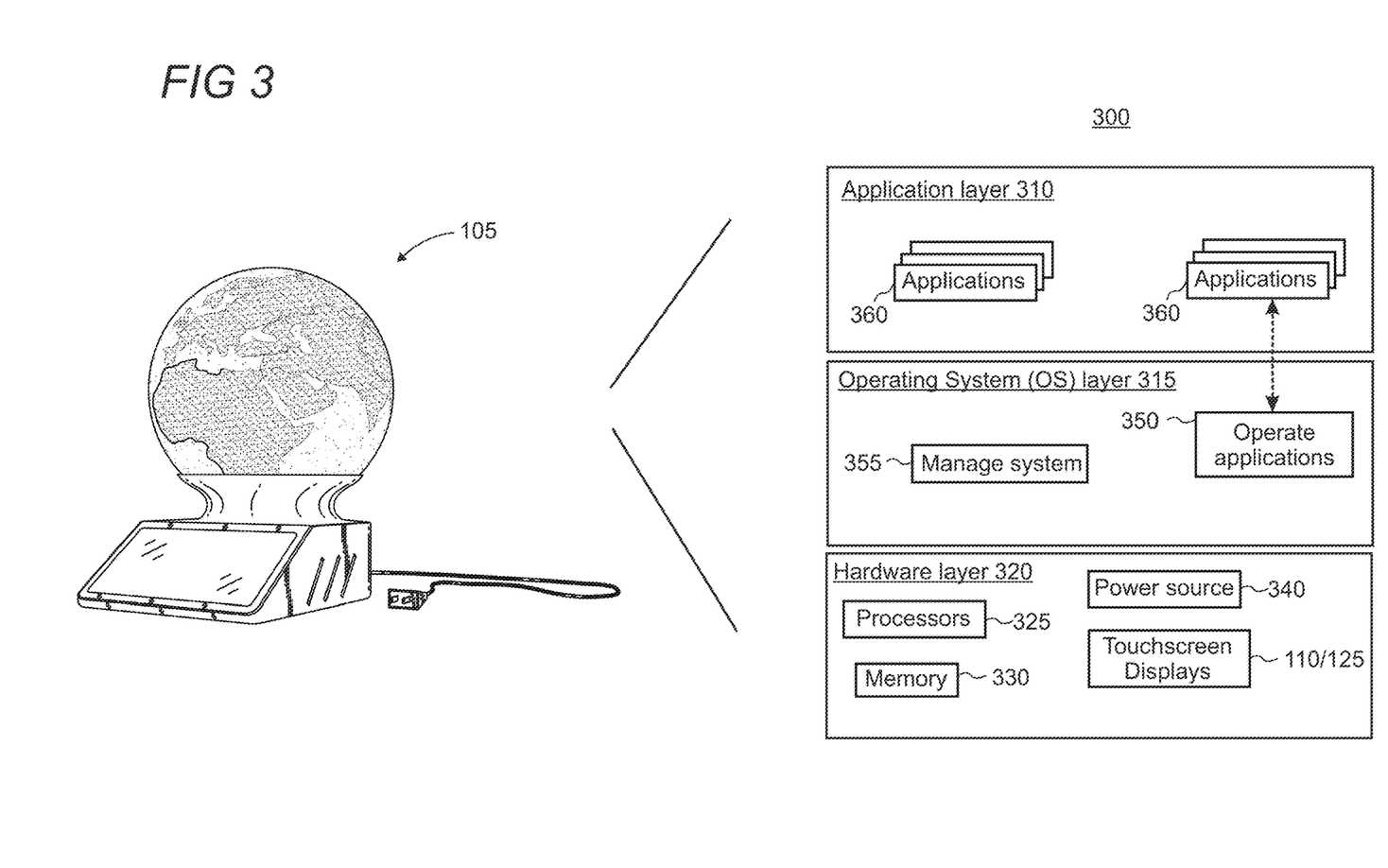
FIG. 3 shows an illustrative layered architecture of the smart globe.

FIG. 3 shows an illustrative layered diagram 300 of the smart globe's architecture to facilitate the functionality and features described herein. The exemplary and simplified architecture is arranged in layers and includes a hardware layer 320, an operating system (OS) layer 315, and an application layer 310. The hardware layer 320 provides an abstraction of the various hardware used by the smart globe 105 to the layers above it. In this illustrative example, the hardware layer supports one or more processors 325, memory 330, power source 340, such as a rechargeable lithium battery, and touchscreen displays 110, 125 (i.e., the primary and secondary touchscreens).

In typical implementations, the one or more processors 325 may be a central processing unit (CPU), a microcontroller configured to perform discrete operations, or a graphics processing unit (GPU) to dedicatedly process the various interfaces on the primary and secondary touchscreens. The memory 330 may include data and instructions which are executable by one or more processors.

The OS layer 315 supports, among other operations, managing the operating system 355 and operating applications 350, as illustratively shown by the arrow. The OS layer may interoperate with the application and hardware layers to facilitate the execution of programs and perform various functions and features.

The application layer 310 can support various applications 360, as discussed in greater detail below. Any number of applications can be utilized by the smart globe 105, whether proprietary or third-party applications. In typical implementations, the applications may be implemented using locally executing code stored in memory 330. Applications not pre-installed may be downloaded from a remote service that hosts various applications for users to peruse and download. Although not shown, the smart globe may have extensibility to external and remote computing devices, such as remote servers, personal or laptop computers, etc. The smart globe may, for example, interoperate with a distinct computer. The smart globe may be configured with a network interface, such as a network interface card (NIC) for wired or wireless communications over Bluetooth®, Wi-Fi, near-field communication (NFC), etc.

Figure 4:
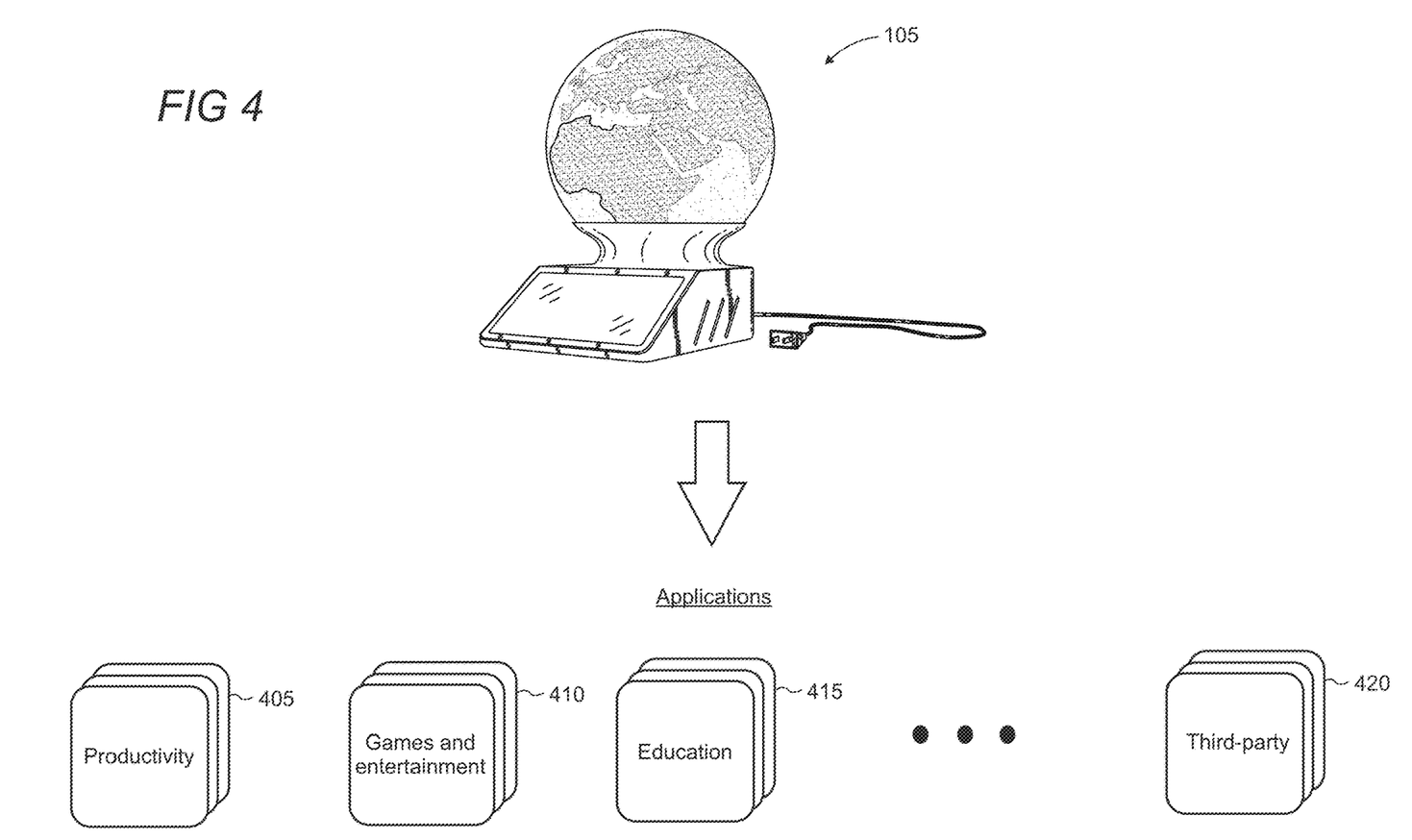
FIG. 4 shows an illustrative representation of applications that may be instantiated on the smart globe.

FIG. 4 shows an illustrative representation in which multiple and various applications can be instantiated on and implemented by the smart globe 105. Exemplary types of applications which can be instantiated on the smart globe include productivity applications 405, games and entertainment applications 410, educational applications 415, and third-party applications 420, among other applications. The various applications can be first-party applications that come pre-installed into the smart globe or can be downloaded from remote services at some future time. Additionally, the third-party applications 420 may be any type and genre of applications developed by third-party developers, including productivity, games and entertainment, education, etc.

The ability to show data across a globe and change the information presented allows for true proportion presentation of geographical data such as place names, country boundaries, weather patterns, flight patterns, planetary surfaces, solar activity, etc. This benefit can be particularly realized when using such productivity, educational, and work-related applications. Other uses, such as in the entertainment industry, enable unique game development designed with the three-dimensional and spherical display or provide a video feed showing a 3D environment. Such capabilities can have applications in VR (virtual reality) simulation and where the panoramic video is taken, such as for reviewing the field of view for self-driving cars.

Figure 5:
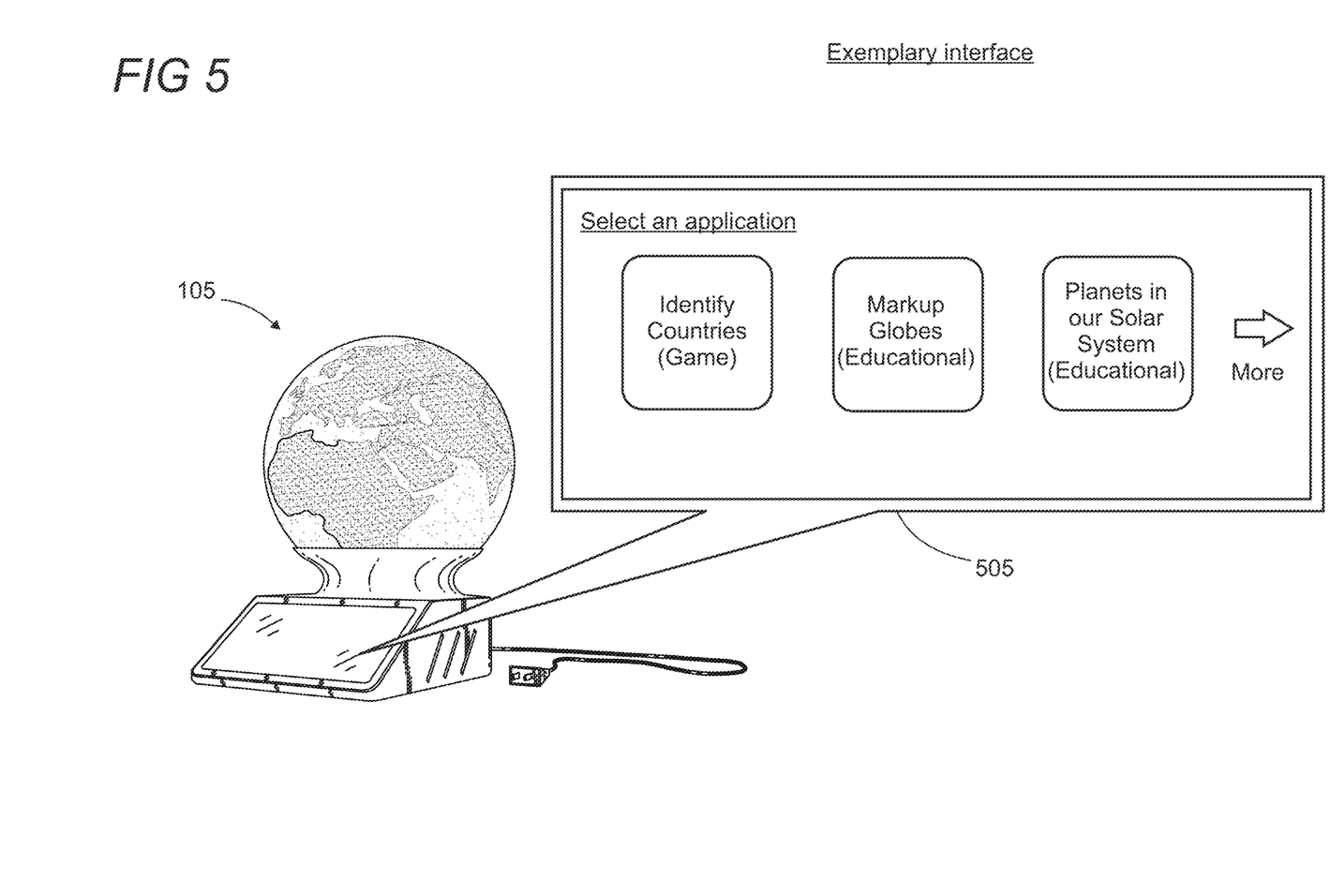
FIGS. 5 and 6 show illustrative user interfaces on the smart globe's secondary touchscreen display.

FIG. 5 shows an illustrative interface showing a secondary user interface 505 on the secondary touchscreen 125. The primary touchscreen 110 may be considered the primary interface as used herein. The exemplary user interface displays a series of applications that the user can select using the touchscreen display. A selection by the user may facilitate a change on the primary interface to enable user interaction with the primary touchscreen 110. For example, selecting the "Identify Countries" game may cause the world globe to display on the primary interface without any country names. The user may be displayed with directions on the primary or secondary interface. For example, on the primary interface, one or more countries may be identified by the game for the user to guess and input the country's name.

Figure 6:
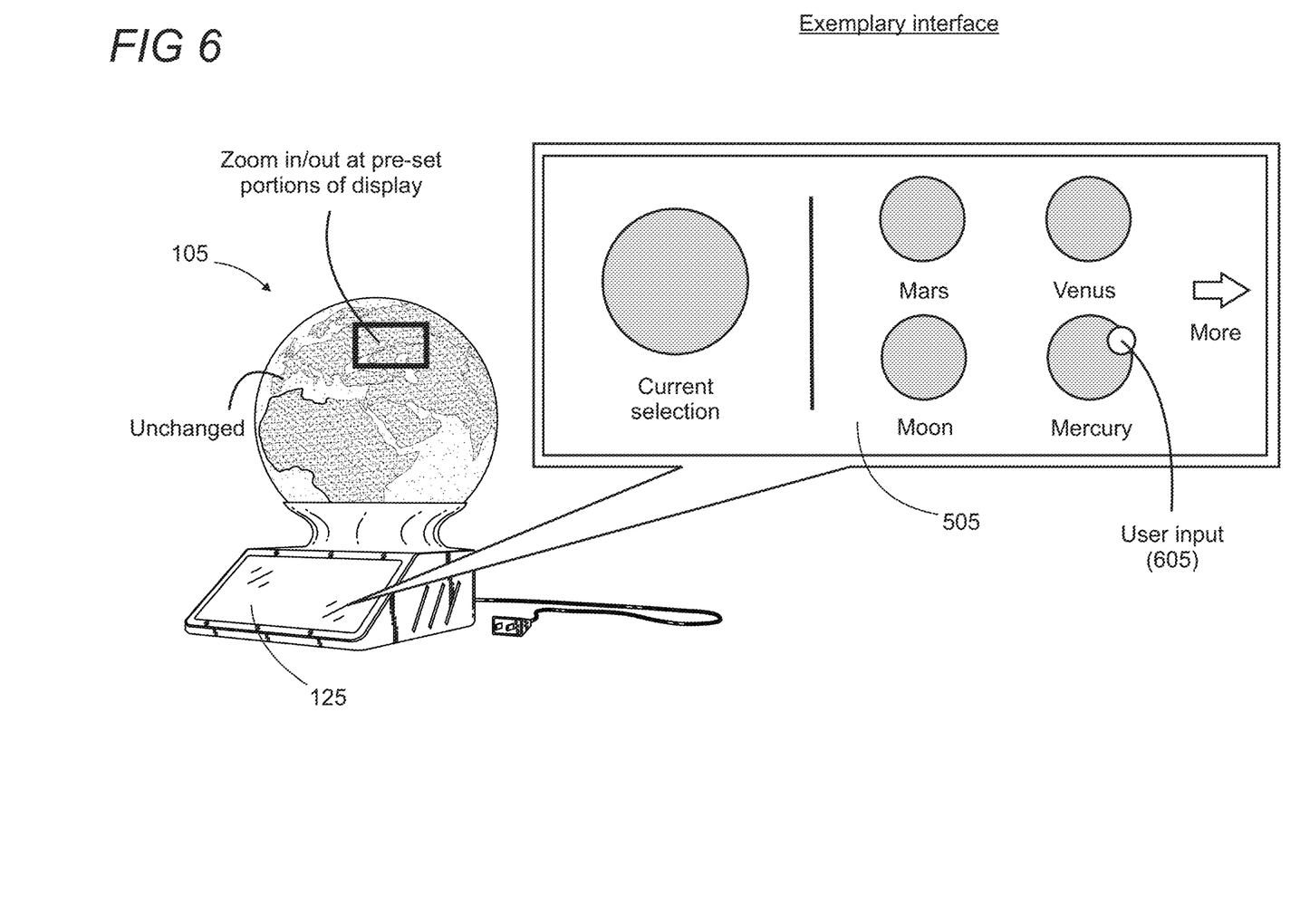

FIG. 6 shows an illustrative interface showing the secondary user interface 505 on the secondary touchscreen 125. In this example, the secondary interface displays a current selection on the primary interface and alternative options that the user may select, which may replace the current selection on the primary interface. For example, by the user selecting Mercury, as representatively illustrated by numeral 605, the primary interface may likewise display Mercury in three-dimensional form. As shown in FIG. 6, the user may likewise zoom in and out at particular locations on the primary touchscreen 110. Zooming may be performed through pinching or widening the user's fingers, using a scroll if a pointing device (mouse) is connected to the smart globe, etc.

The ability to zoom in and out on specific locations on the globe can also help users see the impact of occurrences at various heights. For example, ocean currents or animal migration may look different and more or less impactful further away and can be better scrutinized when zoomed in.

Zooming in and out on the globe's surface may have its own application programming interface (API), and multiple options may be available to a user. For example, when the user zooms in at a particular location, only a portion of the globe surrounding that location may be zoomed in, and the remainder of the globe's display can be unchanged. A pre-set distance around the user's zoomed-in location may be altered, such as a two, three, or several inches around the user's desired mark. Alternatively, the smart globe may independently identify bodies of water or land around the user's desired mark and dynamically and intelligently zoom in accordingly. Since the entire Earth is constantly displayed on the smart globe, at least during a set position, the user may want to use the remainder of the globe as a frame of reference as to where they are exploring.

In some implementations, the user can toggle through whether the entire smart globe zooms in with the user's mark or if only a portion of the screen zooms in. The user may expand or retract the space that is zoomed in. Such viewing customizations can help the user grasp the patterns and occurrences that occur on a globe. In some instances, the globe may be receiving real-time graphics from satellites. Thus, the ability to zoom in and out and customize the viewing can enhance users' experiences and grasp of the information on display.

Zooming on the primary touchscreen 110 may also be controlled and facilitated by the secondary touchscreen 125. For example, the set ranges around the zoomed-in area may be customized or adjusted in real-time using the secondary touchscreen. Alternatively, user zooming input at the primary touchscreen can be shown on the secondary touchscreen display, while the primary touchscreen remains unchanged. This way, the user can continue to see and adjust the globe's area while simultaneously seeing zoomed-in portions on the secondary display.

Figure 7:
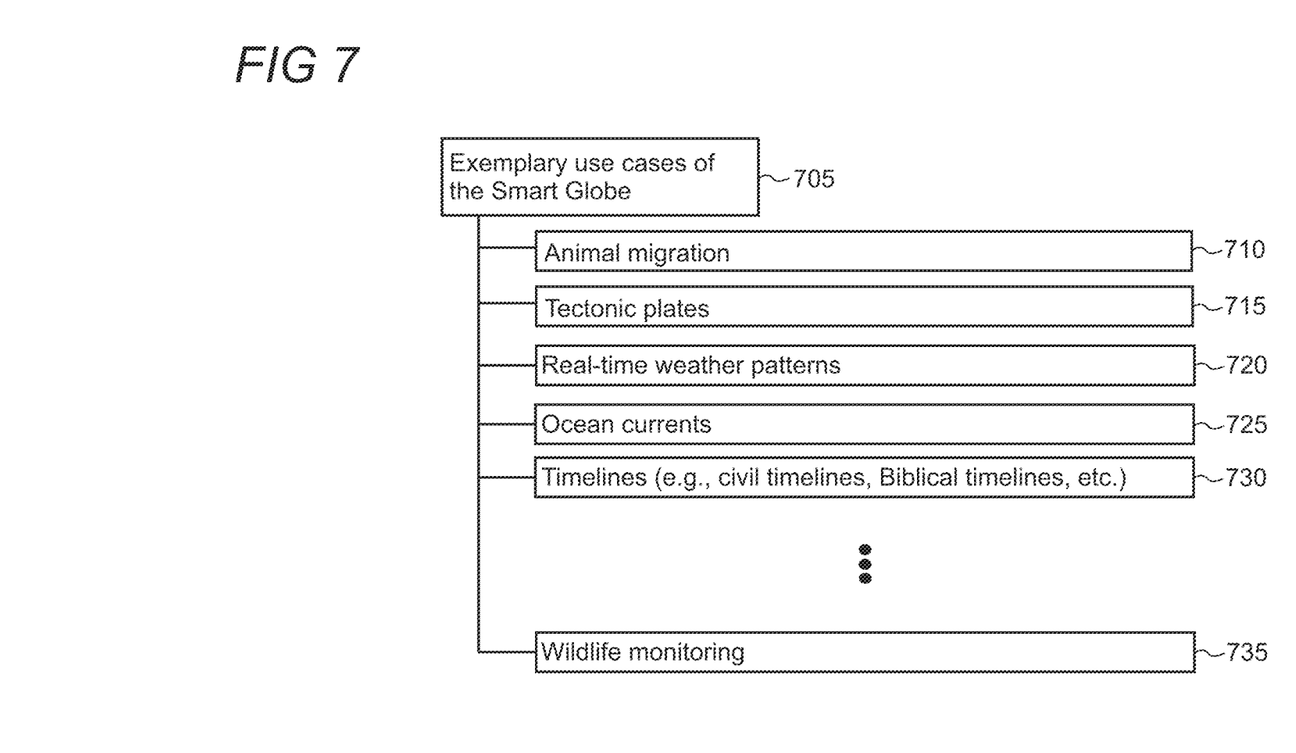
FIG. 7 shows an illustrative schema of use cases for the smart globe.

FIG. 7 shows an illustrative schema of exemplary use cases of the smart globe 705. Exemplary and non-exhaustive use cases include animal migration 710, tectonic plate movements 715, real-time weather patterns 720, ocean currents 725, timelines (e.g., civil timelines, Biblical timelines, etc.) 730, and wildlife monitoring 735, among many other uses. For example, the smart globe's spherical surface can provide enhanced real-life observation and analysis of occurrences on the surface, instead of a user having to rely on a flat or slightly curved monitor.

Figure 8:
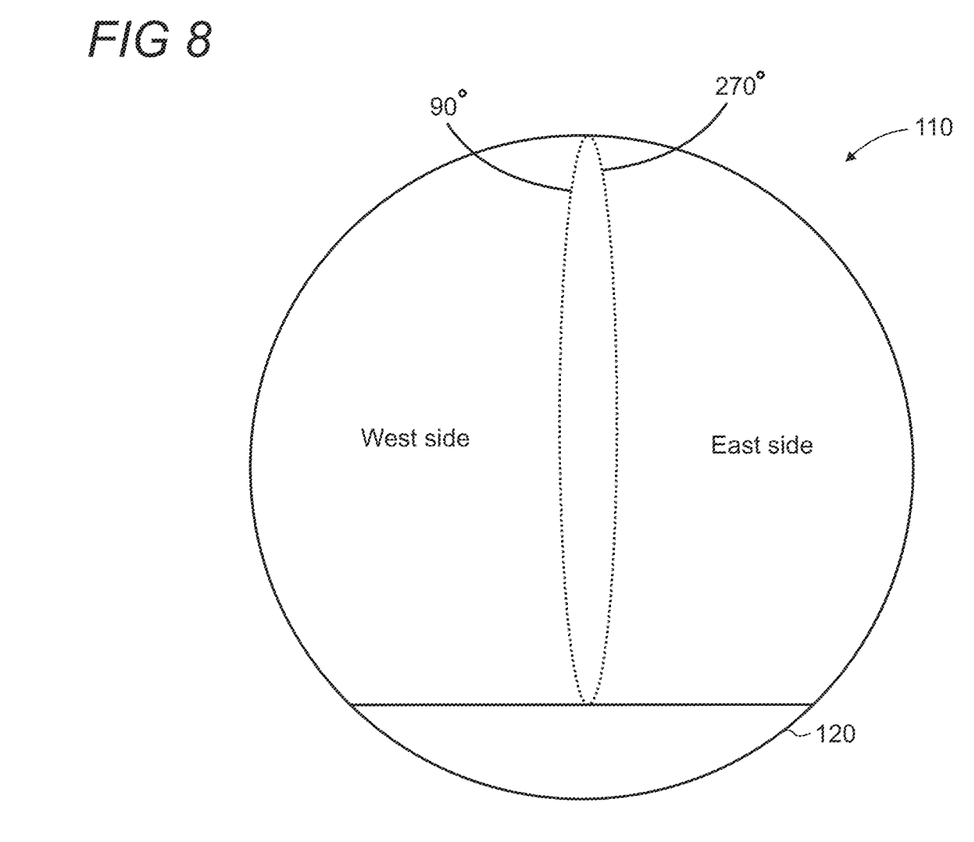
FIG. 8 shows an illustrative configuration of the smart globe's touch screen display split between east and west sides.

FIGS. 8-11 show exemplary structural configurations of the primary touchscreen display 110 of the smart globe 105. FIG. 8 shows an illustrative representation in which the primary touchscreen may be split into two halves, an east side and a west side that are connected at 90° and 270°. While 90° and 270° are shown, other locations to separate the halves are also possible, such as 0° and 180°. The halves may be connected via an adhesive or another mechanism. Alternatively, the entire primary touchscreen may be designed as a single curved structure so that no break in the glass exists. The primary touchscreen may form a complete circle (or semi-circle if in halves) that rests on the receiving surface 120. Alternatively, the primary touchscreen may be a partial sphere and end at the receiving surface. The partial sphere embodiment may be utilized to enable the receiving surface to grasp onto the touchscreen more securely. For example, clamps (not shown) may be used to grip the primary touchscreen to prevent it from escaping. Additional or alternative securing mechanisms may additionally be used, such as adhesive, bolts, screws, etc., or a combination thereof.

Figure 9:
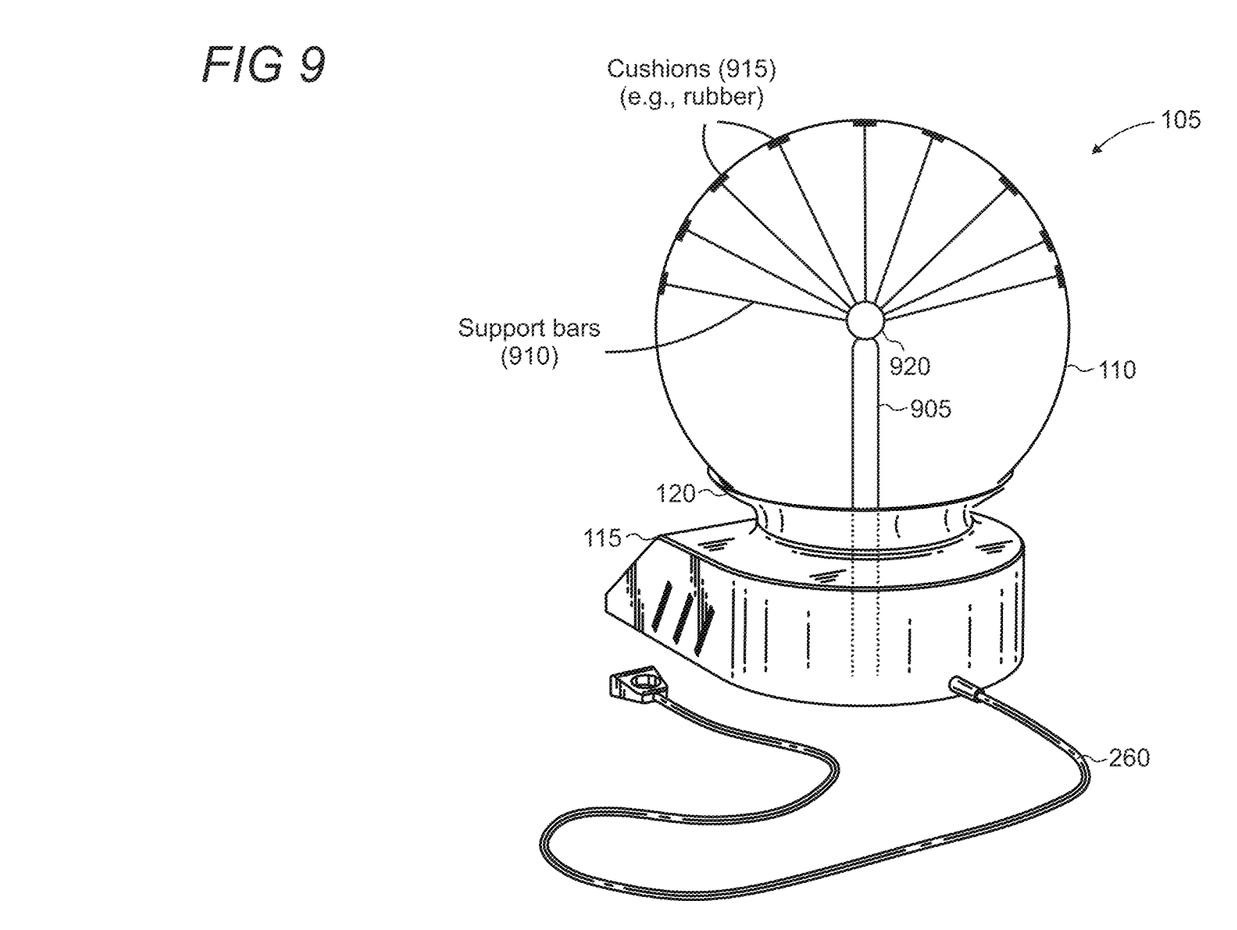
FIG. 9 shows an illustrative internal structure of the smart globe.

FIG. 9 shows an illustrative representation in which the smart globe 105 includes a support bar 905 and multiple support branches 910 that extend from the support bar. The support bar 905 may be secured to some base within the primary touchscreen. The base may be a surface within the receiving structure 120, the base 115, or the bottom of the primary touchscreen 110. For example, the support bar 905 may extend and be attached to the bottom of the base 115 so that additional layers or structures are not present within the smart globe, thereby preventing clutter and enabling greater airflow. In this regard, the support bar would extend from the base, through the receiving structure, and into the primary touchscreen's interior.

The various support branches 910 are present to provide added support to the touchscreen display. For example, user inputs may cause stress against the primary touchscreen display, so the support branches added support could help prevent the display from breaking or wearing over time. The support branches may extend from a central hub 920 that provides greater surface area for multiple branches to attach and extend. The hub may be formed of the same piece as the support bar 905 or welded to or otherwise attached to the support bar. The support bar may be secured to the bottom surface via bolts and a flange, welded, etc. The support bars and branches may be comprised of a metal (e.g., steel, copper), plastic, or other suitable material that can satisfy the purposes herein (to provide support for the touchscreen).

Cushions 915 are positioned between the interior of the primary touchscreen display's surface and the ends of the support branches 910 to create a softer impact between the components. The cushions may be comprised of various materials, such as rubber, some fabric like cotton, or a combination thereof. For example, the cushion may be comprised of rubber with a fabric attached to the side that touches the interior of the touchscreen. While FIG. 9 is shown in two-dimensional form, the support branches may extend throughout the entire smart globe's structure 360°. Furthermore, although FIG. 9 depicts the support branches extending along an upper portion around the globe, the support branches may likewise extend toward the bottom half as well since users may likewise continually tap on the bottom of the globe as well.

Figure 10:
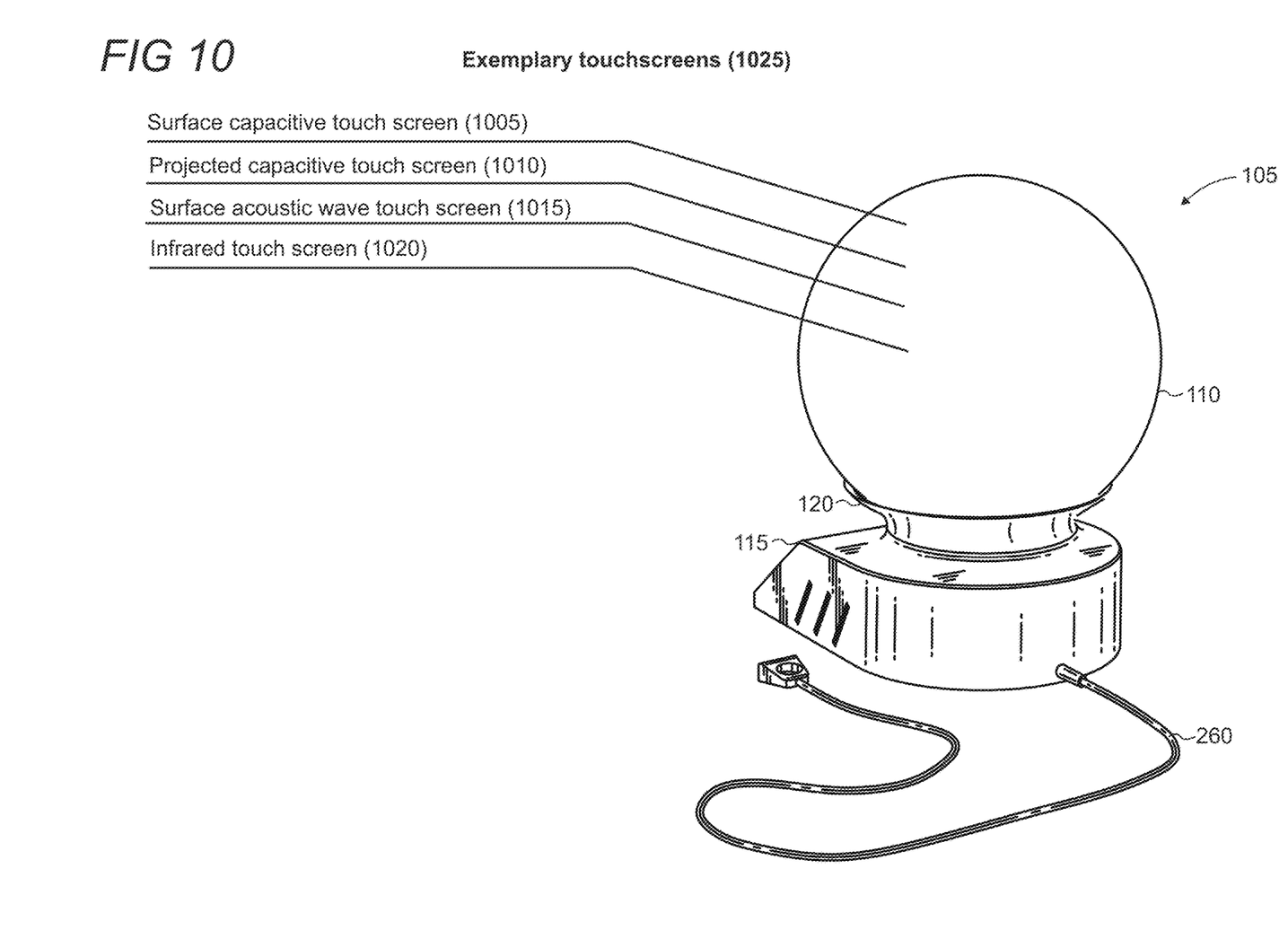
FIG. 10 shows illustrative layers of the smart globe's touch screen.

The primary touchscreen 110 may be comprised of various layers and materials, depending on the specific touchscreen technology used. FIG. 10 shows some exemplary touchscreen technologies that may be used for the primary touchscreen display 110, including a surface capacitive touchscreen 1005, projected capacitive touchscreen 1010, surface acoustic wave touchscreen 1015, and infrared touchscreen 1020. The secondary touchscreen 125 may likewise use one of the touchscreen technologies shown in FIG. 10. The secondary touchscreen may use a different touchscreen technology or the same as the primary touchscreen. For example, since the touchscreen globe may be used differently or more often than the secondary touch screen, the desired touchscreen technology may change for the two interfaces.

Figure 11:
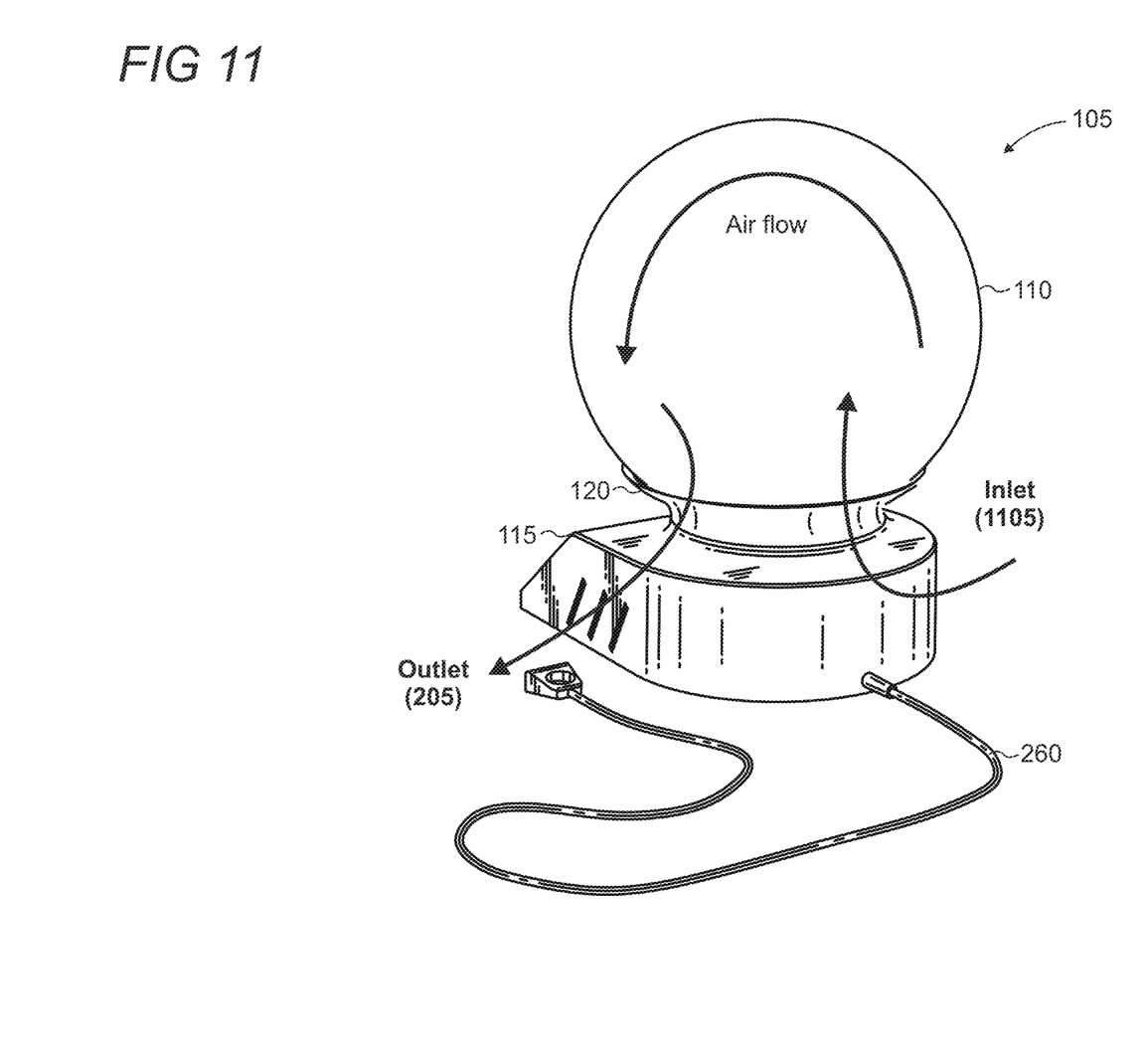
FIG. 11 shows an illustrative environment in which air flows through the smart globe.

FIG. 11 shows an illustrative representation of airflow traveling through the smart globe 105 to allow cooling. The base 115 may have an outlet 205 on one side and an inlet 1105 on the opposite side of the base. The air may travel through the inlet, through the primary touch screen's interior section, and then outward through the outlet. Such an arrangement enables cooling of the internal components and circuitry of the smart globe. The air may likewise flow-through base 115, which may house many of the operational components of the smart globe 105, such as the components shown in FIGS. 3, 14, and 15. Positioning the inlet and outlet at the base 115 provides a greater surface area to receive and output air while also pushing the air throughout the entire structure.

FIG. 8 shows an illustrative architecture 1200 for a device, such as the smart globe 105, capable of executing the various features described herein. The architecture 1200 illustrated in FIG. 12 includes one or more processors 1202 (e.g., central processing unit, dedicated AI chip, graphics processing unit, etc.), a system memory 1204, including RAM (random access memory) 1206, ROM (read-only memory) 1208, and long-term storage devices 1212. The system bus 1210 operatively and functionally couples the components in the architecture 1200. A basic input/output system containing the basic routines that help to transfer information between elements within the architecture 1200, such as during startup, is typically stored in the ROM 1208. The architecture 1200 further includes a long-term storage device 1212 for storing software code or other computer-executed code that is utilized to implement applications, the file system, and the operating system. The storage device 1212 is connected to the processor 1202 through a storage controller (not shown) connected to the bus 1210. The storage device 1212 and its associated computer-readable storage media provide non-volatile storage for the architecture 1200. Although the description of computer-readable storage media contained herein refers to a long-term storage device, such as a hard disk or CD-ROM drive, it may be appreciated by those skilled in the art that computer-readable storage media can be any available storage media that can be accessed by the architecture 1200, including solid stage drives and flash memory.

Figure 12:
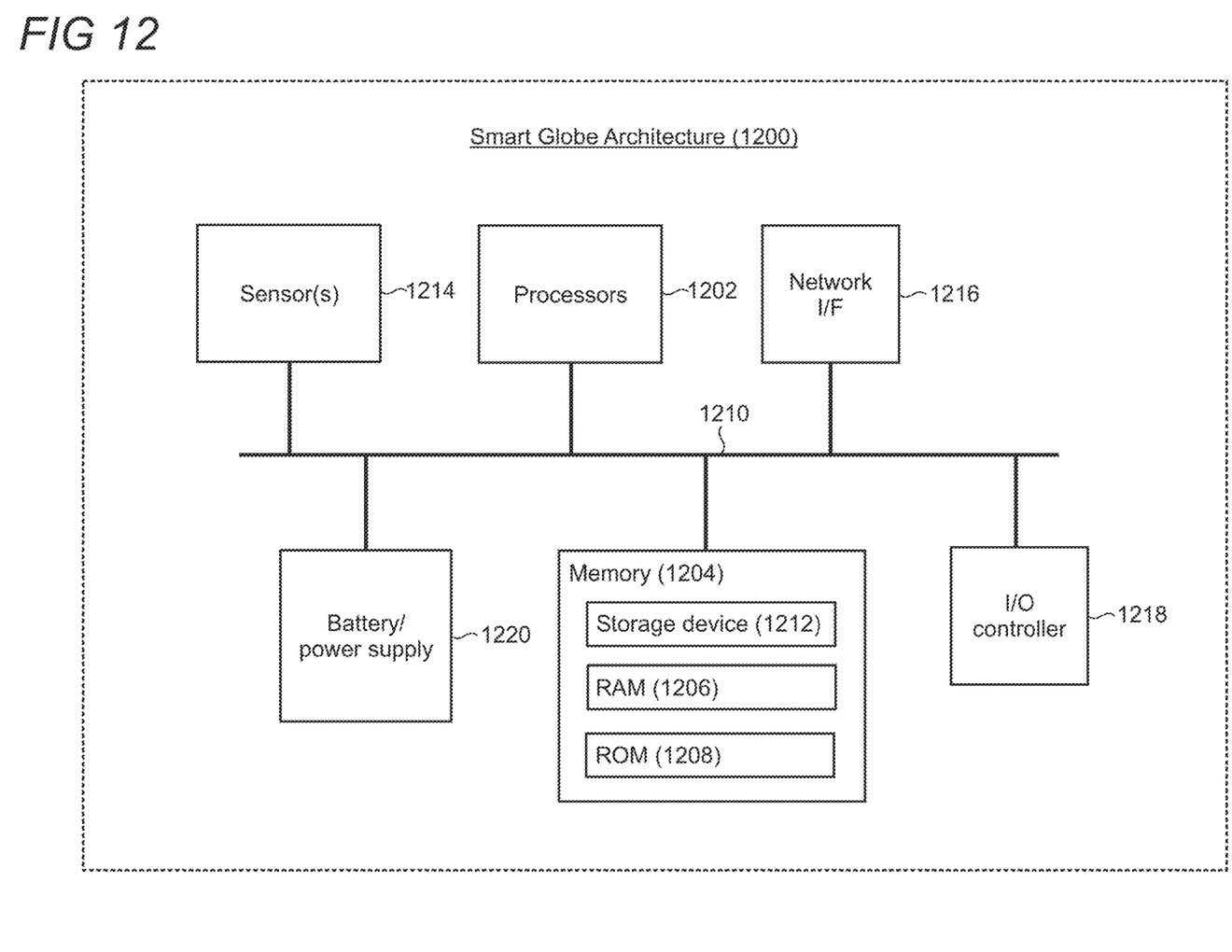
FIG. 12 shows an illustrative computer system architecture that may be used with the smart globe.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 1200.

According to various embodiments, the architecture 1200 may operate in a networked environment using logical connections to remote computers through a network. The architecture 1200 may connect to the network through a network interface unit 1216 connected to the bus 1210. It may be appreciated that the network interface unit 1216 also may be utilized to connect to other types of networks and remote computer systems. The architecture 1200 also may include an input/output controller 1218 for receiving and processing input from a number of other devices, including a keyboard, mouse, touchpad, touchscreen, control devices such as buttons and switches or electronic stylus (not shown in FIG. 12). Similarly, the input/output controller 1218 may provide output to a display screen, user interface, a printer, or other type of output device (also not shown in FIG. 12).

It may be appreciated that any software components described herein may, when loaded into the processor 1202 and executed, transform the processor 1202 and the overall architecture 1200 from a general-purpose computing system into a special-purpose computing system customized to facilitate the functionality presented herein. The processor 1202 may be constructed from any number of transistors or other discrete circuit elements, which may individually or collectively assume any number of states. More specifically, the processor 1202 may operate as a finite-state machine, in response to executable instructions contained within the software modules disclosed herein. These computer-executable instructions may transform the processor 1202 by specifying how the processor 1202 transitions between states, thereby transforming the transistors or other discrete hardware elements constituting the processor 1202.

Encoding the software modules presented herein also may transform the physical structure of the computer-readable storage media presented herein. The specific transformation of physical structure may depend on various factors in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 1200 in order to store and execute the software components presented herein. It also may be appreciated that the architecture 1200 may include other types of computing devices, including wearable devices, handheld computers, embedded computer systems, smartphones, PDAs, and other types of computing devices known to those skilled in the art. It is also contemplated that the architecture 1200 may not include all of the components shown in FIG. 12, may include other components that are not explicitly shown in FIG. 12, or may utilize an architecture completely different from that shown in FIG. 12.

Figure 13:
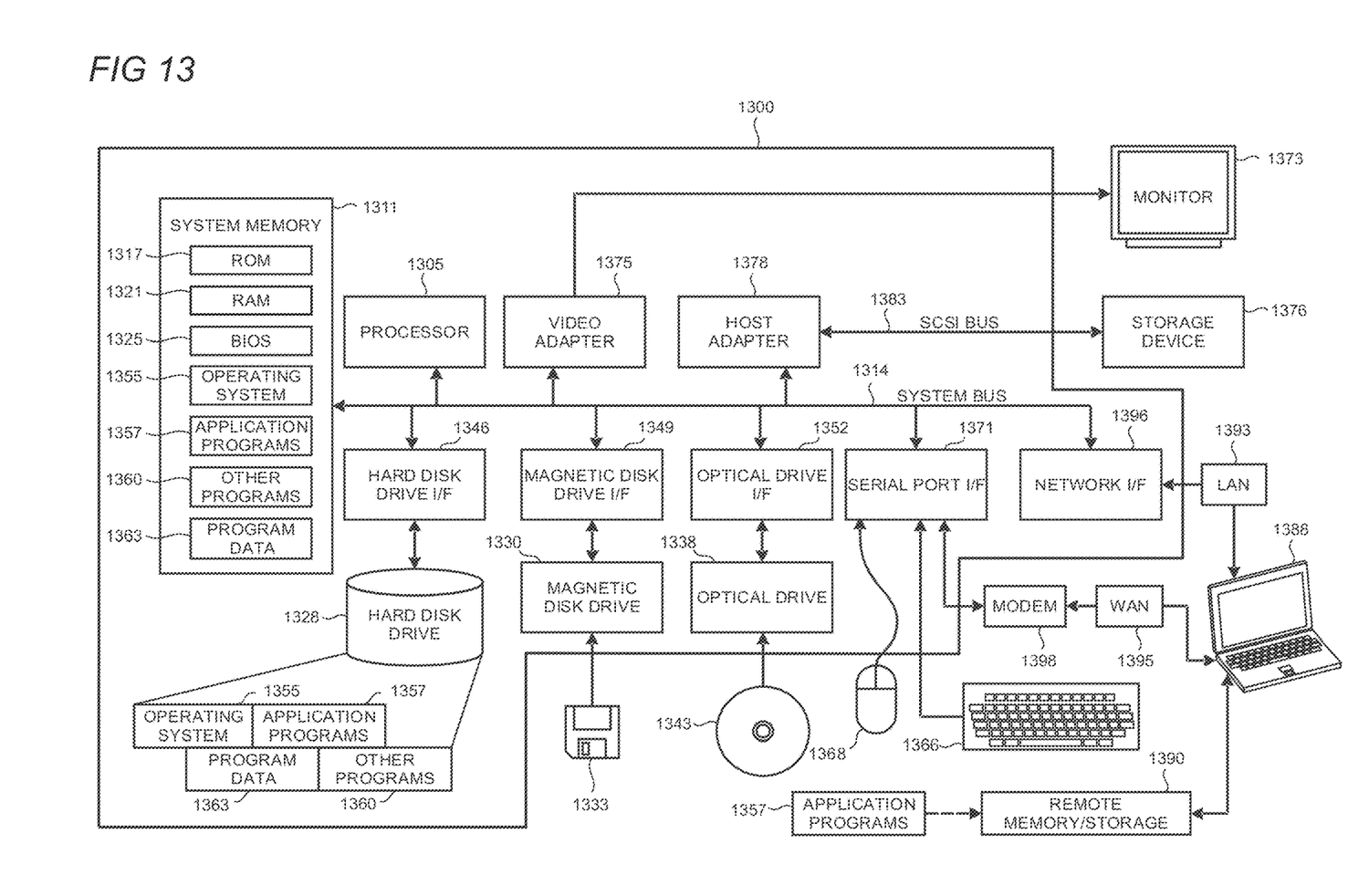
FIG. 13 shows an illustrative computer system architecture associated with the smart globe or a computing device, such as a server or personal computer, that may be used with the smart globe.

FIG. 13 is a simplified block diagram of an illustrative computer system 1300 such as a PC or server with which the present automated adjustment of dialysis machines may be implemented. Computer system 1300 includes a processor 1305, a system memory 1311, and a system bus 1314 that couples various system components including the system memory 1311 to the processor 1305. The system bus 1314 may be any of several types of bus structures including a memory bus or memory controller, a peripheral bus, or a local bus using any of a variety of bus architectures. The system memory 1311 includes read only memory (ROM) 1317 and random-access memory (RAM) 1321. A basic input/output system (BIOS) 1325, containing the basic routines that help to transfer information between elements within the computer system 1300, such as during startup, is stored in ROM 1317. The computer system 1300 may further include a hard disk drive 1328 for reading from and writing to an internally disposed hard disk (not shown), a magnetic disk drive 1330 for reading from or writing to a removable magnetic disk 1333 (e.g., a floppy disk), and an optical disk drive 1338 for reading from or writing to a removable optical disk 1343 such as a CD (compact disc), DVD (digital versatile disc), or other optical media. The hard disk drive 1328, magnetic disk drive 1330, and optical disk drive 1338 are connected to the system bus 1314 by a hard disk drive interface 1346, a magnetic disk drive interface 1349, and an optical drive interface 1352, respectively. The drives and their associated computer-readable storage media provide non-volatile storage of computer-readable instructions, data structures, program modules, and other data for the computer system 1300. Although this illustrative example includes a hard disk, a removable magnetic disk 1333, and a removable optical disk 1343, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present automated adjustment of dialysis machines. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are intended to cover non-transitory embodiments, and do not include waves, signals, and/or other transitory and/or intangible communication media.

A number of program modules may be stored on the hard disk, magnetic disk 1333, optical disk 1343, ROM 1317, or RAM 1321, including an operating system 1355, one or more application programs 1357, other program modules 1360, and program data 1363. A user may enter commands and information into the computer system 1300 through input devices such as a keyboard 1366 and pointing device 1368 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 1305 through a serial port interface 1371 that is coupled to the system bus 1314, but may be connected by other interfaces, such as a parallel port, game port, or universal serial bus (USB). A monitor 1373 or other type of display device is also connected to the system bus 1314 via an interface, such as a video adapter 1375. In addition to the monitor 1373, personal computers typically include other peripheral output devices (not shown), such as speakers and printers. The illustrative example shown in FIG. 13 also includes a host adapter 1378, a Small Computer System Interface (SCSI) bus 1383, and an external storage device 1376 connected to the SCSI bus 1383.

The computer system 1300 is operable in a networked environment using logical connections to one or more remote computers, such as a remote computer 1388. The remote computer 1388 may be selected as another personal computer, a server, a router, a network PC, a peer device, or other common network node, and typically includes many or all of the elements described above relative to the computer system 1300, although only a single representative remote memory/storage device 1390 is shown in FIG. 13. The logical connections depicted in FIG. 13 include a local area network (LAN) 1393 and a wide area network (WAN) 1395. Such networking environments are often deployed, for example, in offices, enterprise-wide computer networks, intranets, and the Internet.

When used in a LAN networking environment, the computer system 1300 is connected to the local area network 1393 through a network interface or adapter 1396. When used in a WAN networking environment, the computer system 1300 typically includes a broadband modem 1398, network gateway, or other means for establishing communications over the wide area network 1395, such as the Internet. The broadband modem 1398, which may be internal or external, is connected to the system bus 1314 via a serial port interface 1371. In a networked environment, program modules related to the computer system 1300, or portions thereof, may be stored in the remote memory storage device 1390. It is noted that the network connections shown in FIG. 13 are illustrative and other means of establishing a communications link between the computers may be used depending on the specific requirements of an application of the present automated adjustment of dialysis machines.

Various embodiments are disclosed herein regarding implementations of the smart globe. In one exemplary embodiment, disclosed is a smart globe, comprising: a primary touchscreen display that is spherically shaped; a secondary touchscreen display, wherein the secondary touchscreen display is attached to a same structure as the primary touchscreen display; one or more processors; and one or more hardware-based memory devices having computer-executable instructions which, when executed by the one or more processors, causes the smart globe to: display a secondary user interface on the secondary touchscreen display for receiving user input; responsive to and based on receiving the user input on the secondary user interface, adjust the primary user interface on the primary touchscreen display.

In another example, the primary touchscreen display is comprised of two distinct displays that are connected. As another example, the two distinct displays connect at 90° and 270° when connected and form the spherical shape. In another example, the touchscreens are LCD (liquid crystal display) screens. As another example, the executed instructions further cause the smart globe to instantiate applications on the smart globe for use, in which the applications include third-party applications developed by third-party developers and which are downloadable to the smart globe. In another example, further comprising a base to which the secondary display is attached, the base having an inlet on one side and an outlet on a different side of the inlet, in which the inlet enables air flow through the primary touchscreen display and out the outlet. As another example, further comprising a vertical shaft that extends from a base of the primary touchscreen display, to which support bars are connected and extend to an interior side of the primary touchscreen display. In another example, further comprising cushions positioned between the interior of the primary touchscreen display and the support bars. In another example, the executed instructions further cause the smart globe to set a pre-set portions for zooming responsive to user input. As a further example, the areas outside of the pre-set portions remain unchanged responsive to the user's input.

In another exemplary implementation, disclosed is a smart globe, comprising: a primary touchscreen display that is spherically shaped, wherein the primary touchscreen display is comprised of two distinct displays that are connected; a secondary touchscreen display, wherein the secondary touchscreen display is attached to a same structure as the primary touchscreen display; one or more processors; and one or more hardware-based memory devices having computer-executable instructions which, when executed by the one or more processors, causes the smart globe to: display a secondary user interface on the secondary touchscreen display for receiving user input; responsive to and based on receiving the user input on the secondary user interface, adjust the primary user interface on the primary touchscreen display; and set a pre-set portions for zooming responsive to user input, and wherein areas outside of the pre-set portions remain unchanged responsive to the user's input.

As another example, the two distinct displays connect at 90° and 270° when connected and form the spherical shape. In another example, the touchscreens are LCD (liquid crystal display) screens. As a further example, the executed instructions further cause the smart globe to instantiate applications on the smart globe for use, in which the applications include third-party applications developed by third-party developers and which are downloadable to the smart globe. As another example, further comprising a base to which the secondary display is attached, the base having an inlet on one side and an outlet on a different side of the inlet, in which the inlet enables air flow through the primary touchscreen display and out the outlet. As another example, further comprising a vertical shaft that extends from a base of the primary touchscreen display, to which support bars are connected and extend to an interior side of the primary touchscreen display. As another example, further comprising cushions positioned between the interior of the primary touchscreen display and the support bars.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A smart globe, comprising:
a primary touchscreen display that is spherically shaped;
a secondary touchscreen display, wherein the secondary touchscreen display is attached to a same structure as the primary touchscreen display;
a vertical shaft that extends from a base of the primary touchscreen display, to which support bars are connected and extend to an interior side of the primary touchscreen display;
cushions positioned between the interior of the primary touchscreen display and the support bars;
one or more processors; and
one or more hardware-based memory devices having computer-executable instructions which, when executed by the one or more processors, causes the smart globe to:
display a secondary user interface on the secondary touchscreen display for receiving user input;
responsive to and based on receiving the user input on the secondary user interface, adjust the primary user interface on the primary touchscreen display.

2. The smart globe of claim 1, wherein the primary touchscreen display is comprised of two distinct displays that are connected.

3. The smart globe of claim 2, wherein the two distinct displays connect at 90° and 270° when connected and form the spherical shape.

4. The smart globe of claim 2, wherein the touchscreens are LCD (liquid crystal display) screens.

5. The smart globe of claim 1, wherein the executed instructions further cause the smart globe to instantiate applications on the smart globe for use, in which the applications include third-party applications developed by third-party developers and which are downloadable to the smart globe.

6. The smart globe of claim 1, wherein the base is attached to the secondary display, the base having an inlet on one side and an outlet on a different side of the inlet, in which the inlet enables air flow through the primary touchscreen display and out the outlet.

7. The smart globe of claim 1, wherein the executed instructions further cause the smart globe to set a pre-set portions for zooming responsive to user input.

8. The smart globe of claim 7, wherein areas outside of the pre-set portions remain unchanged responsive to the user's input.

9. The smart globe of claim 8, wherein the two distinct displays connect at 90° and 270° when connected and form the spherical shape.

10. The smart globe of claim 8, wherein the touchscreens are LCD (liquid crystal display) screens.

11. The smart globe of claim 8, wherein the executed instructions further cause the smart globe to instantiate applications on the smart globe for use, in which the applications include third-party applications developed by third-party developers and which are downloadable to the smart globe.

12. The smart globe of claim 8, wherein the base is attached to the secondary display, the base having an inlet on one side and an outlet on a different side of the inlet, in which the inlet enables air flow through the primary touchscreen display and out the outlet.

13. A smart globe, comprising:
a primary touchscreen display that is spherically shaped, wherein the primary touchscreen display is comprised of two distinct displays that are connected;
a secondary touchscreen display, wherein the secondary touchscreen display is attached to a same structure as the primary touchscreen display;
a vertical shaft that extends from a base of the primary touchscreen display, to which support bars are connected and extend to an interior side of the primary touchscreen display;
cushions positioned between the interior of the primary touchscreen display and the support bars;
one or more processors; and
one or more hardware-based memory devices having computer-executable instructions which, when executed by the one or more processors, causes the smart globe to:
display a secondary user interface on the secondary touchscreen display for receiving user input;
responsive to and based on receiving the user input on the secondary user interface, adjust the primary user interface on the primary touchscreen display; and
set a pre-set portions for zooming responsive to user input, and wherein areas outside of the pre-set portions remain unchanged responsive to the user's input.

* * * * *